US010767322B1

(12) United States Patent
Heiligenstein

(10) Patent No.: US 10,767,322 B1
(45) Date of Patent: Sep. 8, 2020

(54) DIGITAL SNOW AND ICE SENSOR AND HEATING APPARATUS INCLUDING SAME

(71) Applicant: Chromalox, Inc., Pittsburgh, PA (US)

(72) Inventor: Adam Heiligenstein, Gibsonia, PA (US)

(73) Assignee: Chromalox, Inc., Pittsburgh, PA (US)

( * ) Notice: Subject to any disclaimer, the term of this patent is extended or adjusted under 35 U.S.C. 154(b) by 695 days.

(21) Appl. No.: 15/246,983

(22) Filed: Aug. 25, 2016

(51) Int. Cl.
E01C 11/26 (2006.01)
E01H 5/10 (2006.01)

(52) U.S. Cl.
CPC .............. E01C 11/265 (2013.01); E01H 5/10 (2013.01)

(58) Field of Classification Search
CPC ........ E01C 11/265; E01C 11/24; E01C 11/26; E01H 5/10; E01H 5/102; E01H 5/108; H05B 1/0277; H05B 3/36; H05B 2203/003; H05B 2203/017; H05B 2214/02
See application file for complete search history.

(56) References Cited

U.S. PATENT DOCUMENTS

| 6,211,493 B1 * | 4/2001 | Bouman ............... E01C 11/265 219/213 |
| 8,607,509 B2 | 12/2013 | Gurr |
| 8,640,687 B2 | 2/2014 | Tucker |
| 9,121,179 B2 | 9/2015 | Bublitz |
| 2004/0262414 A1 | 12/2004 | Jones |
| 2010/0224621 A1 | 9/2010 | Mortensen |
| 2013/0255665 A1 | 10/2013 | Nickel |
| 2015/0034067 A1 * | 2/2015 | Szekely ................. F24D 3/148 126/271.1 |
| 2015/0089966 A1 * | 4/2015 | Qu ........................ F25D 21/006 62/80 |
| 2016/0084986 A1 | 3/2016 | Zach et al. |
| 2016/0208450 A1 | 7/2016 | Sartori |

FOREIGN PATENT DOCUMENTS

CN 104600651 B 1/2017

OTHER PUBLICATIONS

International Search Report and Written Opinion for Application No. PCT/US2017/048216, dated Oct. 26, 2017 (13 pages).
Farzaneh M et al., "Modeling of Icing and Ice Shedding on Overhead Power Lines Based on Statistical Analysis of Meteorological Data," IEEE Transactions on Power Delivery, IEEE Service Center, NY, NY, U.S. vol. 19. No. 2. Apr. 1, 2004, pp. 715-721. XP011109807. ISSN: 0885-8977. DOI: 10.1109/TPWRD.2003. 822527.

* cited by examiner

Primary Examiner — Shawntina T Fuqua
(74) Attorney, Agent, or Firm — K&L Gates LLP

(57) ABSTRACT

An apparatus and method heat a structure during frozen precipitation. The apparatus comprises: (i) heating means for heating the structure; a control unit 14 for controlling operation of the heating means; and a frozen precipitation forecast sensor that: receives, over a time frame, weather data for a geographic region of the structure; determines, at time instances during the time frame, whether there is a likelihood of frozen precipitation in a geographic zone around the structure based on the received weather data; and transmits command signals to the control unit based on the determinations of whether there is a likelihood of frozen precipitation in the geographic zone around the structure. The command signals can be commands to the control unit for the operational state of the heating means.

17 Claims, 7 Drawing Sheets

DIGITAL SNOW AND ICE SENSOR AND HEATING APPARATUS INCLUDING SAME

BACKGROUND

Snow melt heating systems prevent the build-up of snow and ice on walkways, patios, roadways and other structures by heating the structures when there is snow and ice accumulation. Such systems often include local snow and ice detectors to detect snow and ice at the scene of the structure. When the detector detects moisture and a temperature that is near or below freezing, the detector switches the snow melt heating system on.

Unfortunately, this type of system cannot anticipate frozen precipitation so the heating system must be over-sized so it can quickly heat-up and overcome any accumulation that has occurred from the time the precipitation was first detected to the time the system gained sufficient heat to melt the snow or ice. This can be problematic, especially for snow melt heating systems that are embedded in concrete. Such systems must be sized sufficiently large to quickly heat the concrete slab to begin melting the snow and ice. This adds additional cost in materials and energy to provide such a quick heat-up. This delay in heat-up leads to unsafe accumulation of snow and ice. In addition, the snow detector must be placed on or near the structure to be heated, which requires additional labor and material to run control wiring out to the structure. Further, the sensors are more susceptible to damage when placed at the scene of the structure due to exposure to the environment or physical damage from a snow plow, for example.

SUMMARY

In one general aspect, the present invention is directed to an apparatus and method for heating a structure during frozen precipitation (snow or ice). In various embodiments, the system comprises a heater for heating the structure, a control unit for controlling the operational state of the heater (e.g., On or Off), and a processor-based frozen precipitation forecast sensor. The frozen precipitation forecast sensor is programmed to receive weather data for the geographic region in which the structure to be heated is located and, based on the received weather data, determine whether precipitation is occurring in a geographic zone around the structure. When frozen precipitation is detected in the zone, the frozen precipitation forecast sensor can send a command signal to the control unit that the heater should be in the On state. Conversely, if no precipitation is detected in the zone, the frozen precipitation forecast sensor can send a command signal to the control unit that the heater should be in the Off state.

The frozen precipitation forecast sensor can receive the weather data from reliable weather data sources, such as Internet-connected weather service servers and/or radio broadcasts that transmit digital weather codes. That way, the frozen precipitation forecast sensor does not need to be physically located at the scene of the structure being heated. Further, the frozen precipitation can be detected before it actually begins precipitating at the structure, so long as the frozen precipitation is detected in the geographic zone around the structure. These and other benefits and embodiments of the present invention will be apparent from the description that follows.

FIGURES

Various embodiments of the present invention are described herein by way of example in connection with the following figures, wherein.

DESCRIPTION

Figure 1:
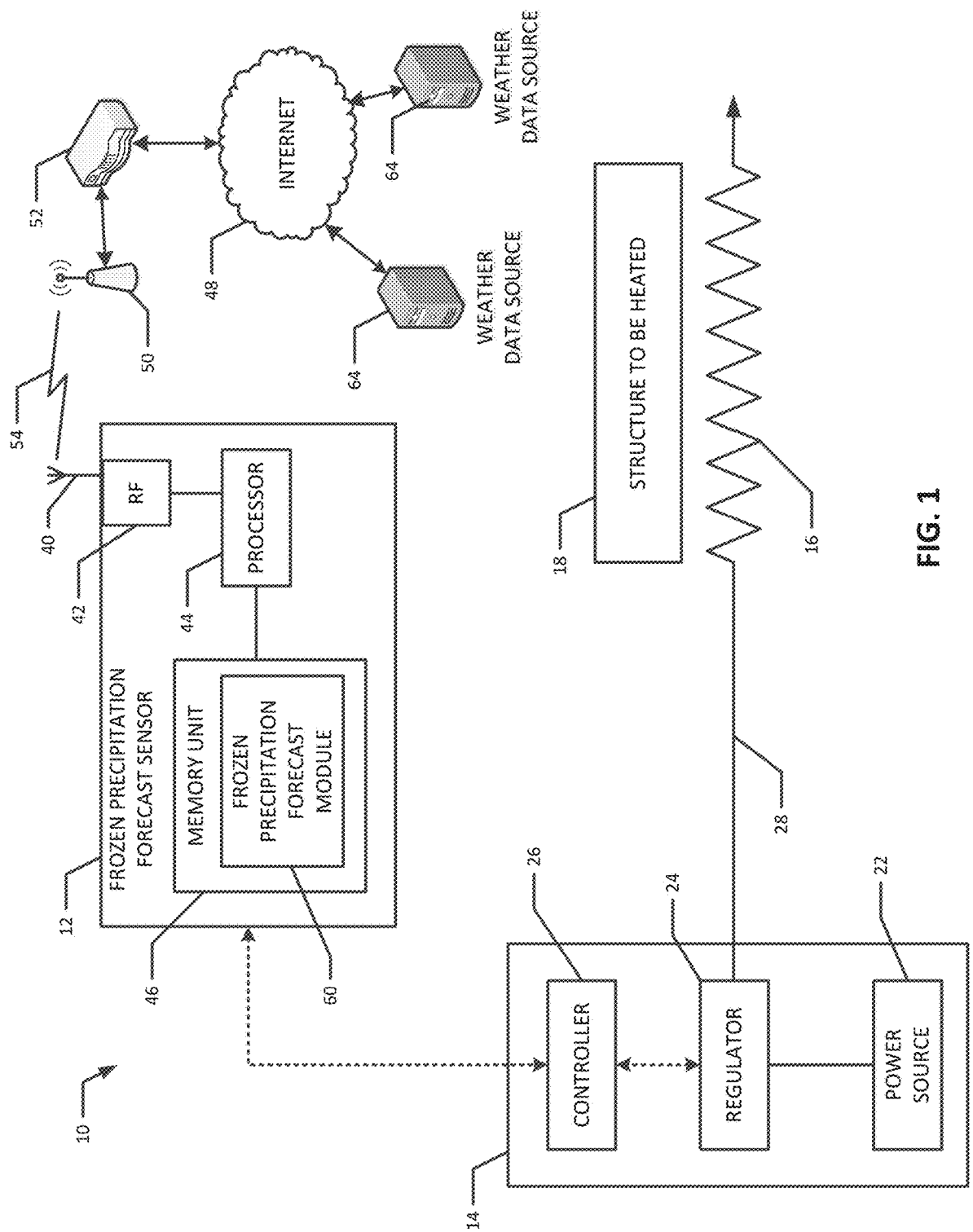
FIGS. 1 and 2 are diagram of heating systems according to various embodiments of the present invention.
Figure 2:
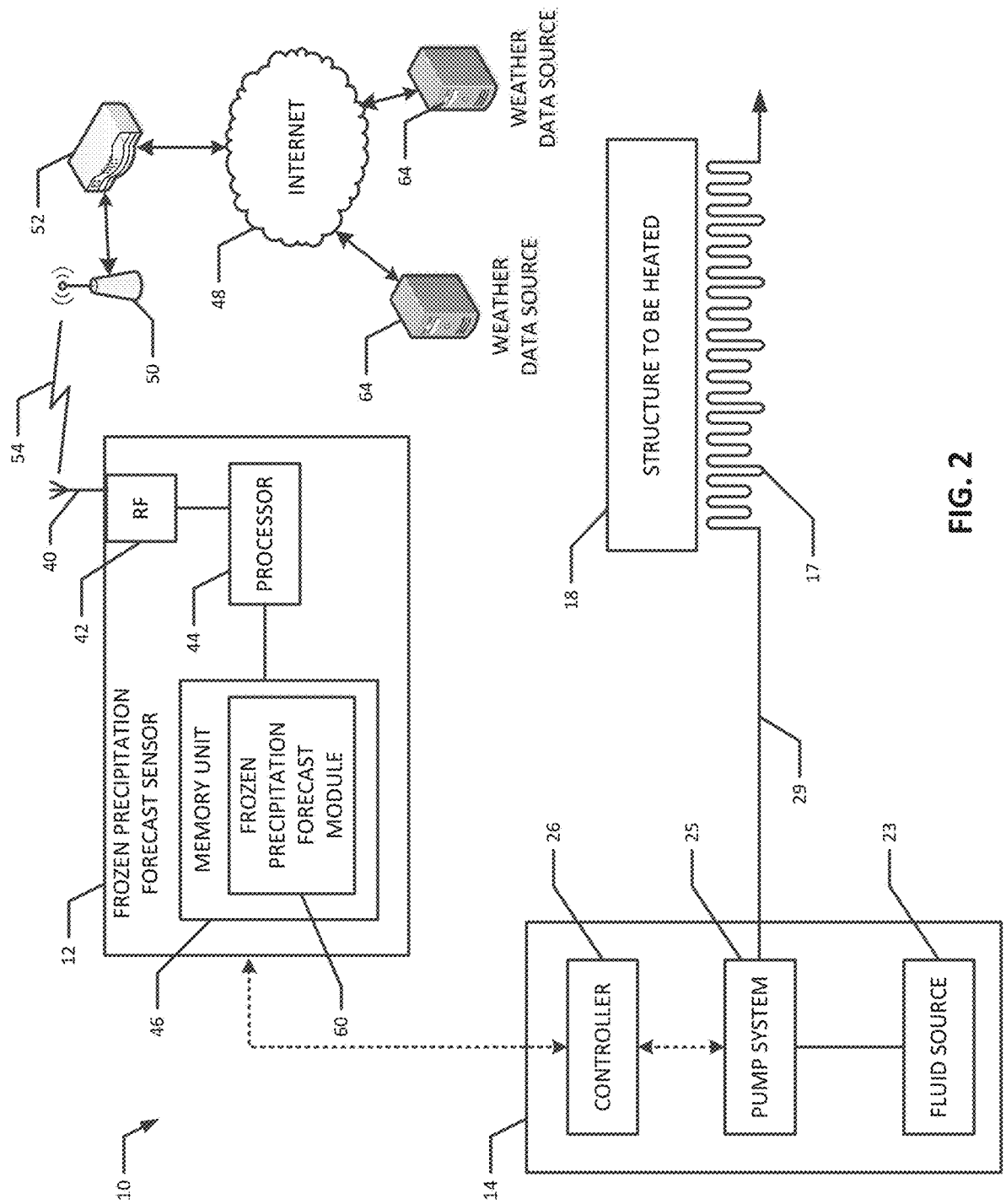

Various embodiments of the present invention are directed to a digital sensor for forecasting frozen precipitation (e.g., snow or ice accumulation) and a heating apparatus that includes the digital frozen precipitation forecast sensor. The heating apparatus can be a snow melt heating system used to melt the snow and/or ice accumulation from structures that are impaired by snow and/or ice accumulation or where snow and/or ice accumulation is otherwise undesirous due to safety, reliability, convenience or other reasons, such as roofs, gutters, driveways, sidewalks, train tracks, roadways, etc. FIGS. 1 and 2 are block diagrams, according to various embodiments of the present invention, of heating systems 10 with a frozen precipitation forecast sensor 12 (sometimes referred to hereinafter as the "sensor 12") that detects whether frozen precipitation is expected in a near-term time horizon based on weather data that the sensor 12 receives. When the sensor 12 determines that frozen precipitation is expected in a near-term time horizon, it can send a signal to the control unit 14 of the heating apparatus 10 to turn on the heater. That way, the heater can be turned on before the frozen precipitation arrives or very soon thereafter, rather than waiting to turn it on until after there has been substantial accumulation on the structure 18. Further, the sensor 12 does not need to be located near the heater or the structure 18 being heated, but instead can be located in a safer location to prevent physical damage, such as from snow plows and other equipment or objects that could physically damage the sensor 12. Such remote location of the sensor 12 can also reduce installation costs.

The example embodiment shown in FIG. 1 is for an electrical (e.g., resistive) heating system whereas the example embodiment shown in FIG. 2 is for a hydronic system that heats the structure 18 with a mixture of hot water and antifreeze. The embodiment shown in FIGS. 1 and 2 both include the frozen precipitation forecast sensor 12 that is in communication with a control unit 14 for the heating apparatus 10. The heater in the embodiment of FIG. 1 comprises a resistive wire 16 that when conducting electricity, generates heat to melt snow and/or ice from the structure 18 to be heated. The heater in the embodiment of FIG. 2 comprises a pipe 17 for circulating the heating fluid, where the heat from the fluid melts the snow and/or ice from the structure 18. As mentioned above, the structure 18 could be a roof, a gutter, a driveway, a sidewalk, a train track, a roadway, or any other structure where it is desirous to melt away snow and ice for safety or other reasons.

The control unit 14 for the resistive heating apparatus of FIG. 1 may comprise a power source 22, a regulator 24, and a controller 26. The power source 22 supplies electrical current to the resistive wire heater 16 via the regulator 24 and a conducting wire 28, which conducts electrical current to the resistive wire heater 16. The power source 22 may be an AC or DC power source. An AC power source can include AC mains power, e.g., 100-480 VAC three phase. A DC power source could comprise a battery, an uninterruptable power supply, or an AC-to-DC power supply, for example. The regulators 24 controls the voltage from the power source 22 applied to a circuit loop that includes the resistive wire heater 16. In various embodiments, the regulator 24 can comprise a silicon-controlled rectifier (SCR) or a linear or switching regulator. The controller 26 controls whether the regulator 24 is on or off, and when it is on, can control the operation of the regulator (e.g., its duty cycle) to thereby control the voltage applied to the connected resistive wire heater 16.

In the embodiment of FIG. 2, the control unit comprises a fluid source 23, a pump system 25, and a controller 26. The pump system 25 pumps the fluid from the fluid source 23 to the heating pipe 17 via an insulated pipe system 29. The controller 26 controls the valves and pumps of the pump system 25 to turn it on and off, and, when turned on, the flow rate and/or temperature of the fluid flowing to the heating pipe 17.

The control units 14 of FIGS. 1 and 2 may comprise additional components that are not shown for sake of simplicity and clarity. For example, the control unit 14 of FIG. 1 may comprise circuit breakers, ground fault detection circuits, etc. The control unit 14 of FIG. 2 may comprise, for example, valves and/or a heater to heat the fluid, and the controller 26 could also control the heater so that the fluid is at the desired temperature.

The controller 26 may be implemented as a smart, microprocessor-based, computing device that, through programming, controls the operation of the regulator 24 or pump system 25, as the case may be. In that connection, the controller 26 may comprise at least one microprocessor and at least one memory unit that stores instructions, e.g., software or firmware, that is executed by the controller's processor(s). The controller 26 may control or implement several functions of the control unit through appropriate circuitry and/or programming, including system diagnostics, ground fault detection, sensor manual override (such as for the sensor 12), etc. In addition, as mentioned above, the controller 26 can control the whether the regulator 24 or pump system 25, as the case may be, is turned on and, if turned on, the voltage or flow rate provided to the heaters 16, 17.

The heating systems could also include feedback loops that control the operation of the heaters 16, 17. That is, the systems could include a temperature sensor(s) (not shown) that detects the temperature of the heater 16, 17 and reports the detected temperature back to the controller 26. The controller 26 controls the regulator 24 or the pump system 25 as the case may be to increase or decrease the temperature of the heater 16, 17. Published U.S. patent application Pub. No. 2016/0161316 to Chromalox, Inc., which is incorporated herein by reference in its entirety, discloses heating systems with temperature sensor that detects the temperature of the heating element and reports the sensed temperature back to a control unit.

As shown in FIGS. 1 and 2, the heating apparatuses 10 may also comprise the frozen precipitation forecast sensor 12. In various embodiments, the sensor 12 receives weather-related data feeds via the Internet and/or radio broadcasts and, based on the received weather-related data, determines whether a frozen precipitation event (e.g., precipitating snow or ice) is expected in a near-term time horizon for the structure 18. When the sensor 12 determines that a frozen precipitation event is expected in a near-term time horizon, the sensor 12 can transmit a signal to the controller 26 of the control unit 14 to turn on the heater 16, 17. The controller 26 can then turn on the voltage regulator 24 or pump system 25 as the case may be to commence heat generation by the associated heater 16, 17, so that the heater 16, 17 can reach the desired temperature before the frozen precipitation event starts or shortly thereafter, instead of waiting until after there is a threshold accumulation amount of snow or ice on the structure 18 before starting the heaters 16, 17. Allowing more time for the heater 16, 17 to heat up in this manner lowers the energy demand of the system. Also, the sensor 12 can determine when the frozen precipitation event is expected to end based on the ongoing weather data feed and, at the expected end time, send a signal to the control unit to turn off the heating system. The system could also implement a time delay to leave the heater 16, 17 on for a predetermined (e.g., user-defined) time period after the frozen precipitation event is expected to end and/or vice versa.

The sensor 12 may be in wired or wireless communication with the control unit 14. For a wired connection, the sensor 12 is preferably located physically near the control unit 14 (e.g., "co-located" with the control unit 14) and the components could be connected by USB, Ethernet or other suitable wired connection types. For a wireless connection, the sensor 12 could be located remotely from the control unit 14, with the remoteness dependent upon the capabilities of the wireless communication protocol employed. For example, the sensor 12 could be in wireless communication with the control unit 14 via a Bluetooth network or an infrastructure or ad hoc WiFi (IEEE 802.11) network or any other suitable wireless network type (e.g., ZigBee, WiMax, etc.). Whether in wired or wireless communication with the control unit 14, the sensor 12 does not need to be physically near the structure 18 to sense how much snow and/or ice has accumulated on the structure 18. Instead, the sensor 12 could be located remotely from the structure 18 in a location where the sensor 12 is less likely to be damaged than if it was located near the structure 18.

FIGS. 1 and 2 provide a simplified block diagram of the sensor 12 according to various embodiments of the present invention. In the illustrated embodiment, the sensor 12 comprises an antenna 40, an RF module 42, a processor 44, and a memory unit 46. The antenna 40 and RF module 42 provide wireless communication capability for the sensor 12 so that the sensor 12 can receive wireless data from the Internet 48 or other type of data network, such as RSS and/or XML feeds of weather-related data. In various embodiments, the sensor 12 may be connected to a wireless network (e.g., a Wi-Fi network) provided by a wireless access point (WAP) 50 that is connected (e.g., via a router 52) to the Internet 48. In that connection, the RF module 42 can be an electronic circuit or device that is in communication with the processor 44 and that is used to transmit and receive wireless communications via a wireless communication link 54.

The WAP 50 can be part of a wireless network installation in a building that is near or includes the structure 18, although in other embodiments the WAP 50 could be part of a wireless network installation that is remote from the structure 18. Also, in other embodiments, the sensor 12 could have a wired connection to the router 52, such a via an Ethernet cable connection. Also, instead of being connected to a WiFi or other type of wireless network using a WAP 50, the RF module 44 could connect to the Internet 48 via a digital cellular network, such as 3G, 4G, GSM, Edge, UMTS, or LTE cellular networks, for example. Also, in various embodiments, the RF module 42 and antenna 40 can be replaced with an Ethernet port that connects directly to router 52 via an Ethernet cable.

The processor 44 of the sensor 12 can comprise one or more microprocessors or digital signal processors (DPSs), for example. The memory unit 46 can store instructions, e.g., software and/or firmware, that are executed by the processor 44. To that end, the memory unit 46 may comprise RAM, ROM or flash memory, or any other suitable primary secondary data storage device or secondary data storage device (including magnetic and/or optical memory devices). In particular, as shown in FIGS. 1 and 2, the memory unit 46 may comprise a frozen precipitation forecast module 60 (sometimes referred to herein as "the module 60") that comprises software that when executed by the processor 44 causes the processor 44 to determine, based on the weather data feed, whether there frozen precipitation event expected in the geographic location of the structure 18, including when the frozen precipitation event is expected to commence and end in the geographic location of the structure 18. As mentioned previously, the processor 44, executing the module 60, can send signals to the control unit 14 to turn the heating system on and off (or keep it on or off as the case may be).

In various embodiments, the processor 44, through execution of the software of the module 60, periodically fetches the weather-related data from one or more data sources 64 (e.g., implemented as servers) on the Internet 48. As mentioned previously, the fetched data could be RSS and/or XML data feeds from Internet-connected weather services host server systems 64. For example, the U.S. National Oceanic and Atmospheric Administration (NOAA) currently provides RSS and/or XML weather feeds for approximately 1800 locations across the U.S. via Internet-connected weather service servers. The sensor 12 can subscribe to the feed(s) for the location that is geographically closest to the structure 18 to determine the weather conditions near the structure 18 and, in particular, whether there is or expected to be a frozen precipitation event. Other Internet data sources besides the NOAA could also be used. For example, the sensor 12 could download the local base reflectivity weather radar from public and/or commercial weather sources and determine from that data if there is frozen precipitation approaching a user-defined zone that includes the structure 18.

Figure 3A:
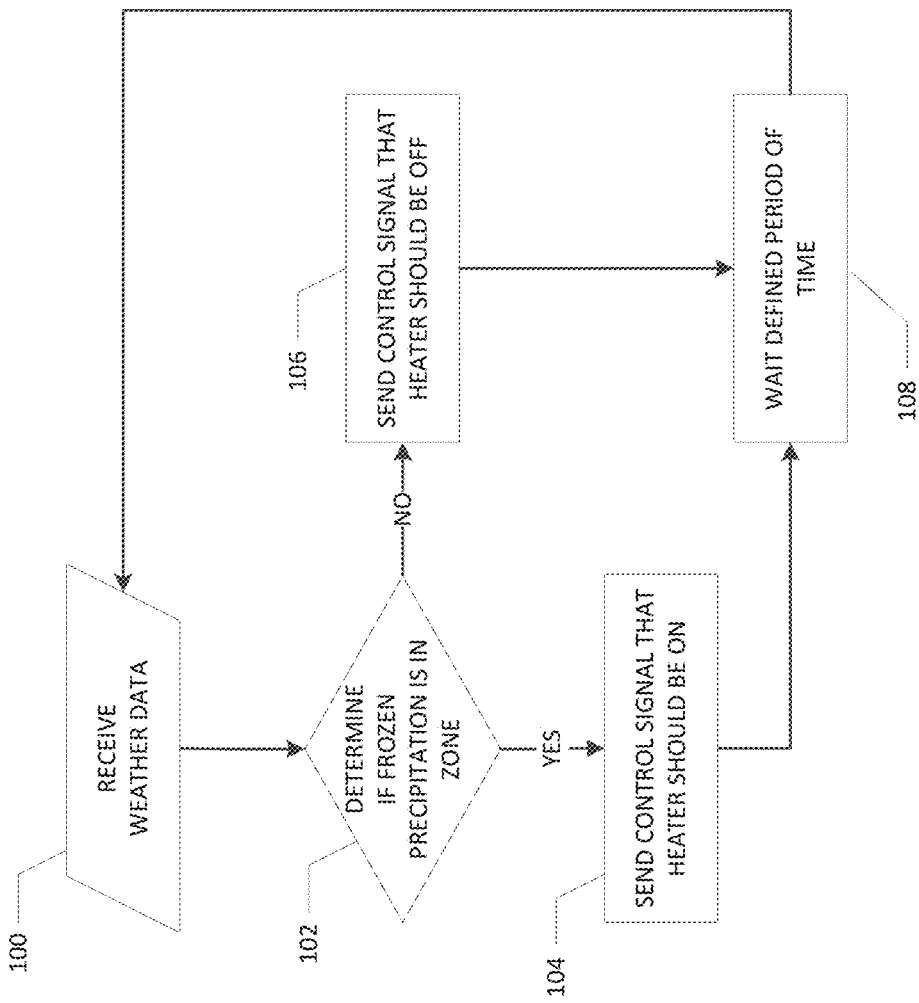
FIGS. 3A and 3B are flow chart illustrating process flows implemented by the frozen precipitation forecast sensors of FIGS. 1 and 2 according to various embodiments of the present invention.
Figure 3B:
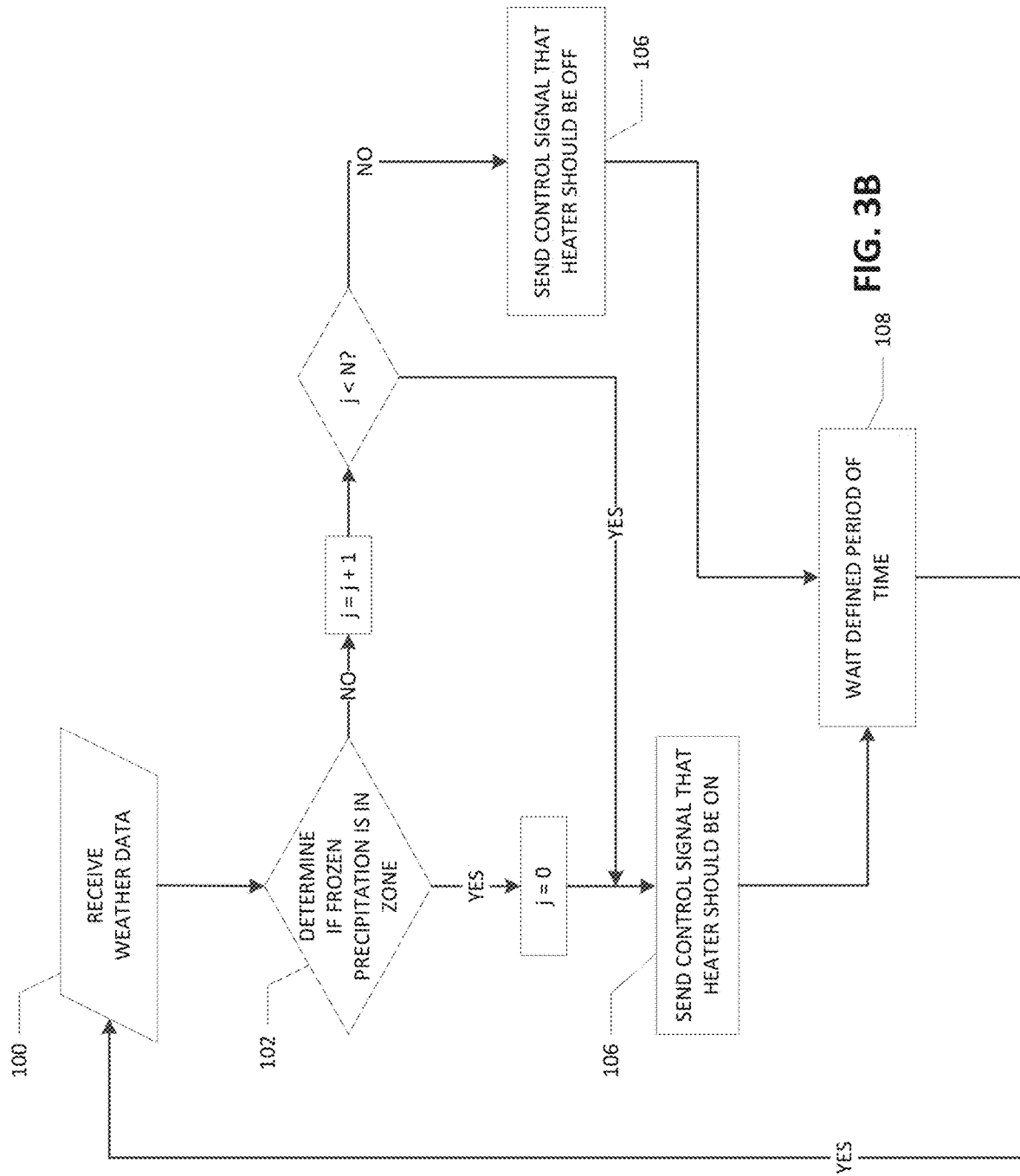
Figure 4:
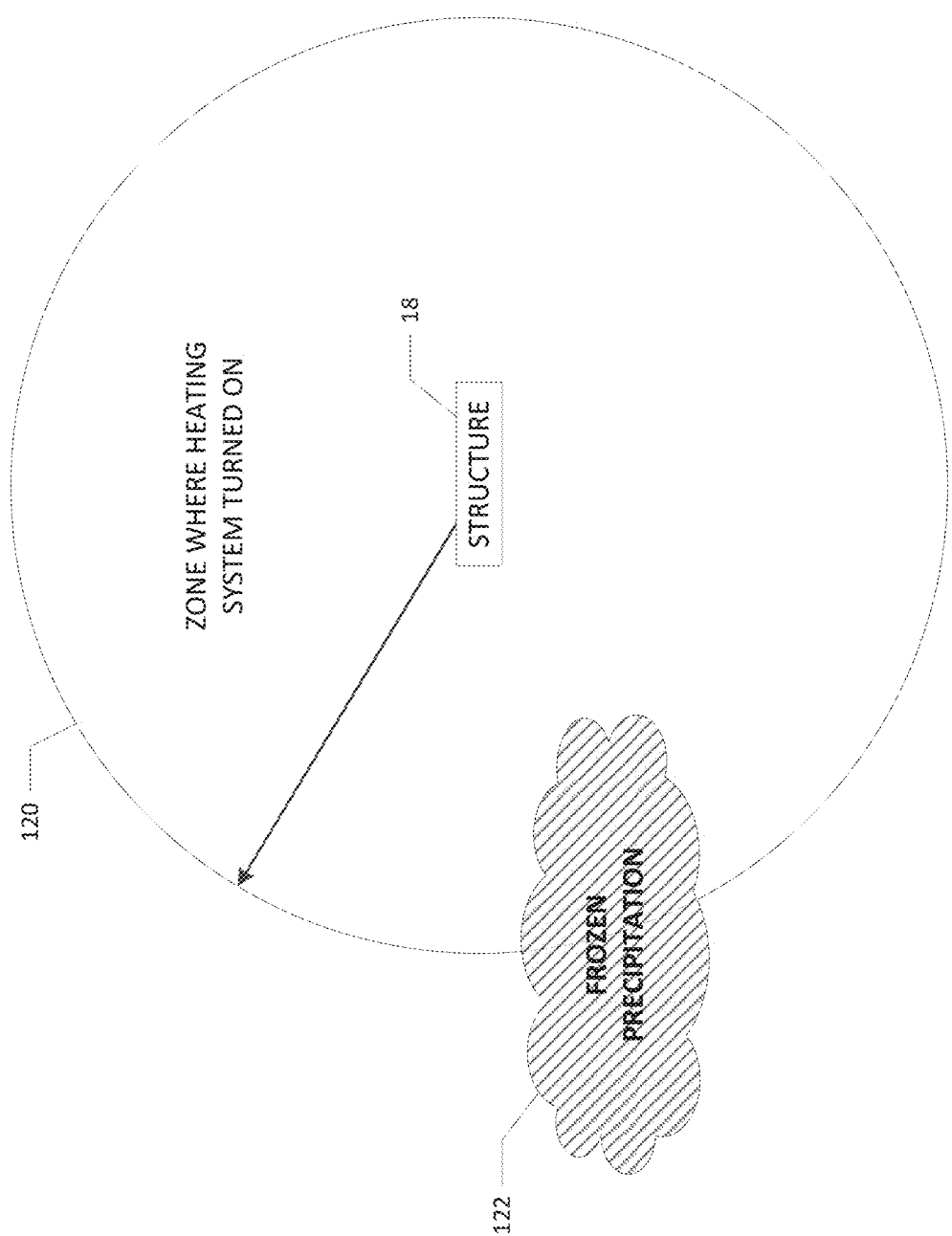
FIG. 4 illustrates how frozen precipitation may be detected in a geographic zone around a structure to be heated according to various embodiments of the present invention.

FIG. 3A is a flow chart of an example process flow that can implemented by the processor 44 when executing the code of the module 60. At step 100, the processor 44 downloads the relevant weather-related data from pre-programmed Internet weather data sources 64. That is, the sensor 12 can be provided and store the IP addresses of the desired Internet weather data sources 64 and contact those Internet weather data sources 64 to fetch the data. At step 102, the processor 44 determines if there is, at the present moment, a likelihood that there is frozen precipitation in a pre-defined geographic zone around the structure 18 based on the received weather data. FIG. 4 provides an illustrative example of this determination. FIG. 4 shows a zone 120 around the structure 18. If, from the received weather data, frozen precipitation 122 is presently expected to be occurring within the geographic zone 120, then at step 104 (see FIG. 3), the sensor 12 instructs the control unit 14 that the heater 16, 17 should be in the "on" state (e.g., turn the heater on if it is off, or leave it on if it is already on). On the other hand, if at step 102 is determined from the received weather data that frozen precipitation is not presently expected to be occurring within the geographic zone 120, then at step 106, the sensor 12 instructs the control unit 14 that the heater 16, 17 should be in the "off" state (e.g., turn the heater off if it is on, or leave it off if it is already off). From both steps 104 and 106 the process can advance to step 108, where the sensor 12 waits a predefined period of time (e.g., a number of seconds or minutes) before returning to step 100 to fetch the weather data again and repeat the process.

At step 102, the processor 44 can determine whether the frozen precipitation 122 is within the zone 120 by determining, from the weather data, whether latitude-longitude coordinates within the zone 120 are likely experiencing frozen precipitation at the present moment. The memory unit 46 stores latitude-longitude coordinates that are within the zone 120. The weather data can indicate the latitude-longitude coordinates where the frozen precipitation is occurring and when the latitude-longitude coordinates where the frozen precipitation is occurring corresponds to one (or more) of the zone's latitude-longitude coordinates, the processor 44 can conclude that there is frozen precipitation within the zone 120. In the example of FIG. 4 the zone 120 is a circle around the structure 18 with a radius of, for example, one to several miles. That way, the occurrence of frozen precipitation can be detected before it reaches the structure 18 so that the heater 16, 17 can turn on before the snow or ice begins to accumulate. In other embodiments, the structure 18 does not need to be located at the center of the zone 120. In addition, in other embodiments the zone does not need to be circular in shape. For example, if weather patterns in the vicinity of the structure 18 generally approach from the west, the zone could have a shape, such as an ellipse or oval, that extends further to the west than to the east.

Particularly when the periodicity at which the weather data is fetched is short (e.g., time period of step 108), it may not be desirable to turn off the heater as soon as it is determined that there is no present occurrence of frozen precipitation in the zone. Instead, the sensor 12 could wait a delay period before instructing the control unit 14 to turn off the heater. FIG. 3B is flow chart for the sensor 12 that is similar to FIG. 3A, except that the sensor 12 waits N time periods (i.e., the time periods for fetching the data) of consecutive determinations of no frozen precipitation before sending a command to turn off the heater. That way, if within those N time periods it is determined at step 102 that there is a likelihood of frozen precipitation in the zone, the counter (j in FIG. 3B) is reset to zero and from that point there would have to be N consecutive time periods of no frozen precipitation before the heater is turned off. In another embodiment, there could also be another counter of consecutive time periods of frozen precipitation before the heater is turned on. Other ways of implementing the delays, besides multiples of the data update time periods, could also be used in various embodiments.

The memory unit 46 can also store software that when executed by the processor 44, causes the processor 44 to act as a web server so that a user can log into the sensor 12 in order to input parameters for the frozen precipitation detection, such as the size and shape of the precipitation zone and location of the sensor 12 (e.g., longitude and latitude), as described further herein. In such a manner, the user could program the sensor 12 remotely from any suitable device having a web browser (assuming the user is authorized), such as PC, laptop, smartphone, etc. In various embodiments, the sensor 12 could have Bluetooth capability that permits the user to program the sensor 12 via a Bluetooth connection. Also, in various embodiments, the sensor 12 can periodically connect to a "back-end" or administrative server system on the Internet 48 so that the sensor 12 can check for software updates or data source updates, etc.

Figure 5:
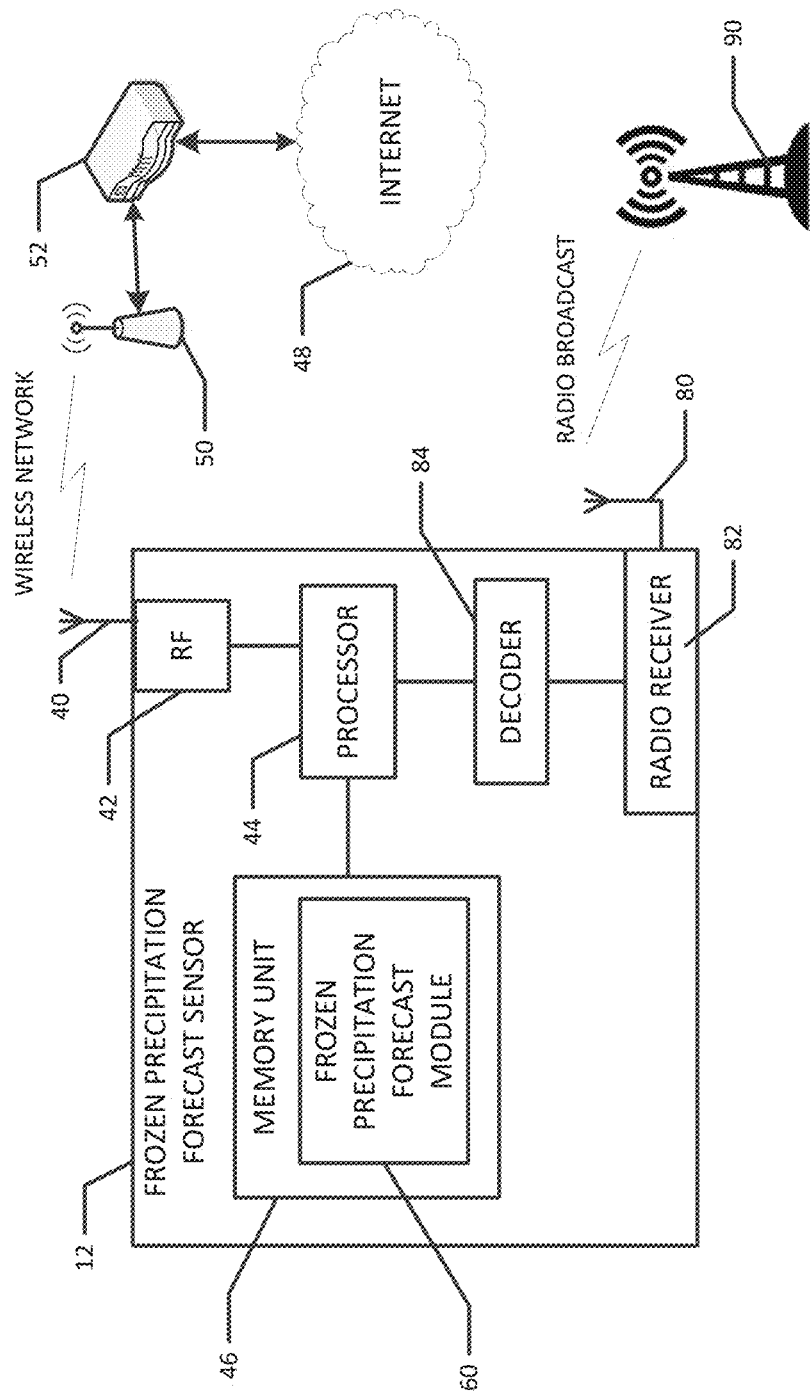
FIG. 5 is a block diagram of the frozen precipitation forecast sensor according to other embodiments of the present invention.
Figure 6:
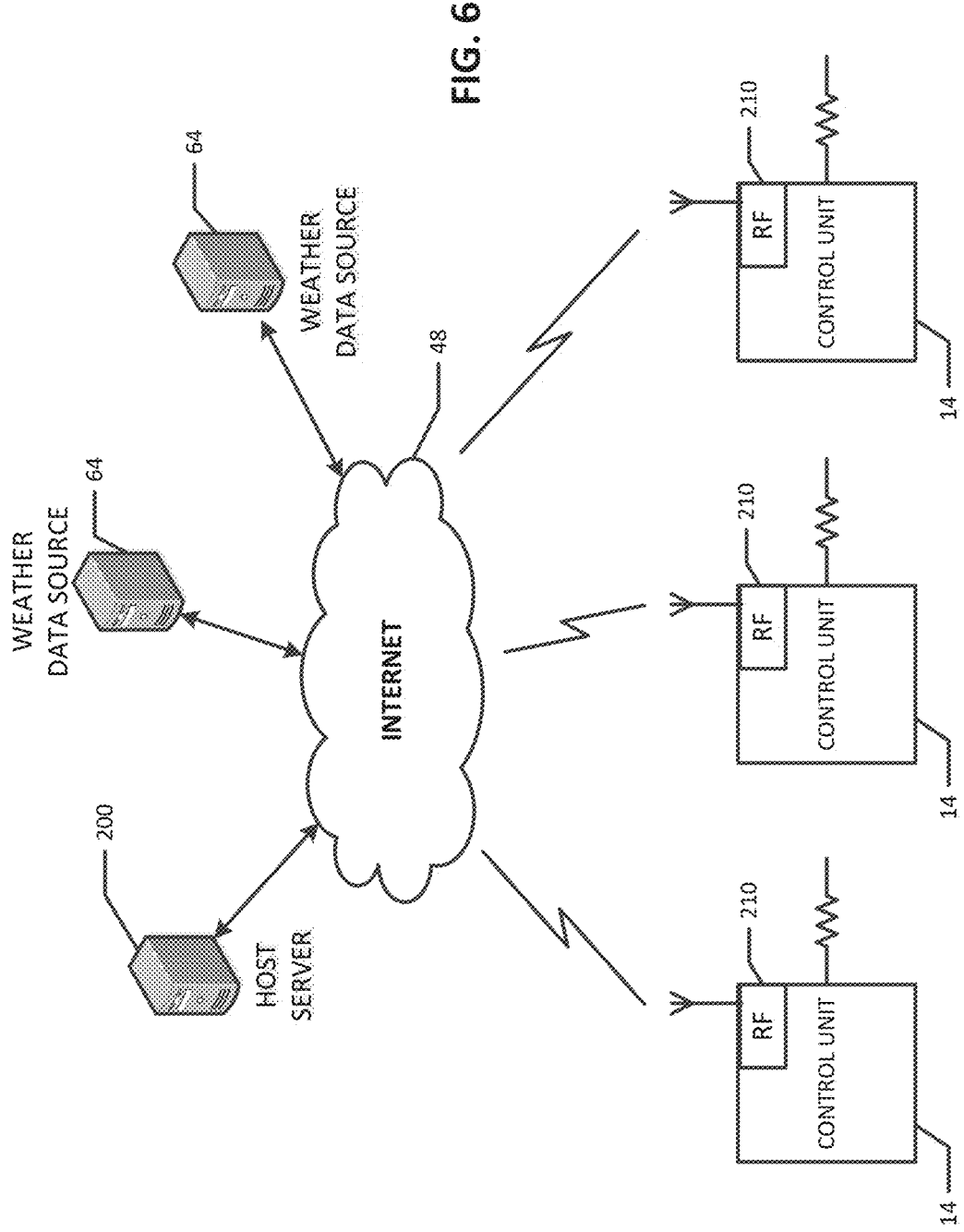
FIG. 6 is a block diagram of an Internet-connected host server that acts the frozen precipitation forecast sensor according to various embodiments of the present invention.

Another embodiment of the sensor 12 is shown in FIG. 5. The sensor 12 of FIG. 6 is similar to that shown in FIGS. 1 and 2, except that the FIG. 6 embodiment additionally includes a radio antenna 80 and a receiver 82, as well as a decoder 84 that is in communication with the receiver 82 and the processor 44. In such an embodiment, the radio receiver 82 can be tuned to pick up a radio broadcast from a radio transmitter 90 that transmits digital weather alert codes via radio. For example, NOAA Weather Radio All Hazards (NWR) is a nationwide network of radio stations broadcasting continuous weather information directly from the nearest National Weather Service office. NWR broadcasts official Weather Service warnings, watches, forecasts and other hazard information 24 hours a day, 7 days a week. The NWR stations broadcast "Specific Area Message Encoding" (SAME) codes that are digital codes that encode weather related messages and data from the NWR. Additionally or alternatively, the sensor 12 can receive and decode other digital weather reports, such as METAR or TAF codes from automated weather stations or airports. The decoder 84 can decode the digital weather codes that it receives and provide the decoded messages to the processor 44. The processor 44 can use the decoded messages from the radio broadcasts in its determination of whether there is frozen precipitation in the zone 120 around the structure 18 (see FIG. 4). Preferably the radio receiver 82 is tuned to a transmitter 90 that transmits weather codes pertinent to the geographic area in which the structure 18 is located.

It should be noted that in various embodiments the decoded radio messages could be used in addition to the fetched Internet weather data described above or in lieu of the Internet weather data. That is, in various embodiments, the sensor 12 could comprise (i) both the radio receiver 82/decoder 84 for receiving the radio digital weather codes and the RF module 42 for receiving the Internet weather data, (ii) just the RF module 42, or (iii) just the radio receiver 82/decoder 84 for receiving the radio digital weather codes. Where the sensor 12 uses multiple data sources, the sensor 12 can employ a suitable data fusion or weighting algorithm to combine the data from the different sources.

In another embodiment exemplified by FIG. 6, a host server system 200 on the Internet monitors the frozen precipitation expectations for numerous heaters 16, 17, which may be geographically disperse, and transmits the control signals via the Internet 202 to the control units 14 for those heaters. In such an embodiment, the host server 200 may store location coordinates (e.g., longitude and latitude coordinates) for structures 18 being heated and an IP address for the control units 14 that control each heater. The host server 200 may perform the process of FIG. 3 simultaneously for each of the heaters. To that end, the host server 200 may receive (e.g., fetch) weather related data feeds from one or more relevant weather data sources 64 connected to the Internet 48. The host server 200 should receive weather related data from a sufficient number of Internet weather data sources 64 to reliably cover the geographic areas in which the heaters/structures are located. By comparing the coordinates of the frozen precipitation to the coordinates for the zone 120, the host server 200 can determine if there is frozen precipitation in the zone 120. Whenever the host server 200 determines that there is frozen precipitation in the zone around one of the structures 18, the host server 200 sends a control signal to the control 14 for that heater/structure, using the stored IP address for the control unit 14, to turn on the heater (or keep it on if it is already on). Conversely, whenever the host server 200 determines that there is no frozen precipitation in the zone around a structure 18, the host server 200 sends a control signal to the control 14 for that heater/structure, using the stored IP address for the control unit 14, to turn the heater off (or keep it off if it is already off).

In such an embodiment, the control units 14 need a way to communicate with the host server 200. The control units 14 could have a wired connection to the Internet 48 or, as shown in FIG. 6, a wireless connection. For control units 14 that have a wireless Internet connection, the control unit 14 may comprise an RF module 210 that sends and receives wireless communications for the control unit 14 using a wireless communication protocol. For example, the RF module 14 could comprise a WiFi circuit that connects to a WiFi WAP that is connected to the Internet 202. In another embodiment, the RF module 14 could comprise a cellular telephone network interface that connects to the Internet 202 via a cellular telephone network.

In one general aspect, therefore, the present invention is directed to an apparatus and associated method for heating a structure during frozen precipitation. In various embodiments, the apparatus comprises: (i) heating means 16, 17 located near the structure 18 for heating the structure; a control unit 14 connected to the heating means for controlling operation of the heating means; and a frozen precipitation forecast sensor 12 that is in communication with the control unit (see FIGS. 1 and 2). The frozen precipitation forecast sensor comprises one or more programmed processors 44 that program the frozen precipitation forecast sensor to: receive, over a time frame, weather data for a geographic region of the structure; determine, at time instances during the time frame, whether there is a likelihood of frozen precipitation in a geographic zone around the structure based on the received weather data; and transmit command signals to the control unit based on the determinations of whether there is a likelihood of frozen precipitation in the geographic zone around the structure. The command signals can be commands to the control unit for the operational state of the heating means. For example, upon a determination that there is a likelihood of frozen precipitation in the geographic zone around the structure, the frozen precipitation forecast sensor transmits a first command signal to the control unit that the heating means should be in an ON state. Conversely, upon a determination that there is not a likelihood of frozen precipitation in a geographic zone around the structure, frozen precipitation forecast sensor transmits a second command signal to the control unit that the heating means should be in an OFF state.

In another embodiment, the apparatus comprises, in addition to the heating means and control unit, a host server 200 that is in communication with the control unit via the Internet. The host server is programmed to: (i) receive, over a time frame, weather data for a geographic region of the structure, wherein the weather data are received via the Internet from one or more Internet-connected weather service servers that serve weather data via the Internet; (ii) determine, at time instances during the time frame, whether there is a likelihood of frozen precipitation in a geographic zone around the structure based on the received weather data; and (iii) transmit command signals to the control unit via the Internet based on the determinations of whether there is a likelihood of frozen precipitation in the geographic zone around the structure, wherein the command signals comprise commands signals for the operational state of the heating means, and wherein the control unit controls the heating means based on the commands signals transmitted by the frozen precipitation forecast sensor.

A method according to various embodiments of the present invention may include the steps of: receiving, over a time frame, by a frozen precipitation forecast sensor that comprises one or more programmed processors, weather data for a geographic region of the structure; (ii) determining, by the one or more programmed processors of the frozen precipitation forecast sensor at time instances during the time frame, whether there is a likelihood of frozen precipitation in a geographic zone around the structure based on the received weather data; (iii) transmitting, by the frozen precipitation forecast sensor, command signals to a control unit that controls the operation of a heater used for heating the structure, wherein the command signals comprise commands signals for the operational state of the heater and the command signals are based on the determinations of whether there is a likelihood of frozen precipitation in the geographic zone around the structure; and (iv) controlling, by the control unit, the operational state of the heater based on the command signals received from the frozen precipitation forecast sensor.

In various implementations, the frozen precipitation forecast sensor receives periodic weather data from one or more Internet-connected weather service servers 64 that serve weather data via the Internet 48 and determines whether there is a likelihood of frozen precipitation in the geographic zone around the structure based on the periodic weather data received from the one or more Internet-connected weather service servers. In addition to or in lieu of the Internet-connected weather service servers, the frozen precipitation forecast sensor can receive and decode digital weather codes via a radio broadcast, with the decode digital weather codes being used to determine whether there is a likelihood of frozen precipitation around the structure to be heated.

In various implementations, the frozen precipitation forecast sensor is in wireless or wired communication with the control unit. Also, the heating means could comprise an electric resistive heater or a hydronic heating system.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. Those of ordinary skill in the art will recognize that a sufficient understanding of the present invention can be gained by the present disclosure, and therefore, a more detailed description of such elements is not provided herein.

The servers described herein may be implemented as computer servers that execute software and/or firmware code. As such, the servers may include one or more processors or other programmable circuits to execute the software and firmware code. The software may use any suitable computer software language type, using, for example, conventional or object-oriented techniques. Such software may be stored on any type of suitable computer-readable medium or media of the computing devices, such as, for example, primary or secondary computer memory. The primary memory can include main memory (such as RAM and ROM), processor registers and processor cache. The secondary memory can include magnetic or optical storage systems, or flash memory, for example, such as HDDs and/or SSDs.

Reference to "one embodiment" or "an embodiment" means that a particular feature, structure, or characteristic described in connection with the embodiment is comprised in at least one embodiment. The appearances of the phrase "in one embodiment" or "in one aspect" in the specification are not necessarily all referring to the same embodiment. Further, while various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. An apparatus for heating a structure during frozen precipitation, the apparatus comprising:

heating means located near the structure for heating the structure;

a control unit connected to the heating means for controlling operation of the heating means;

a memory configured to store at least one geographic coordinate within a user-defined geographic zone around the structure;

a frozen precipitation forecast sensor that is in communication with the control unit, wherein the frozen precipitation forecast sensor comprises one or more programmed processors that program the frozen precipitation forecast sensor to:

receive, over a time frame, weather data for a geographic region in which the structure is located;

determine, at time instances during the time frame, at least one geographic coordinate associated with a likelihood of frozen precipitation based on the received weather data;

determine whether the at least one geographic coordinate associated with a likelihood of frozen precipitation is the same as the at least one geographic coordinate within the user-defined geographic zone around the structure; and transmit command signals to the control unit, based on the determination that the at least one geographic coordinate associated with a likelihood of frozen precipitation is the same as the at least one geographic coordinate within the user-defined geographic zone around the structure, wherein the command signals comprise command signals for the operational state of the heating means, and wherein the control unit controls the heating means based on the command signals transmitted by the frozen precipitation forecast sensor;

wherein:

upon a determination that the at least one geographic coordinate associated with a likelihood of frozen precipitation is the same as the at least one geographic coordinate within the user-defined geographic zone around the structure, the frozen precipitation forecast sensor transmits a first command signal to the control unit that the heating means should be in an ON state;

upon a determination that the at least one geographic coordinate associated with a likelihood of frozen precipitation is not the same as the at least one geographic coordinate within the user-defined geographic zone around the structure, the frozen precipitation forecast sensor transmits a second command signal to the control unit that the heating means should be in an OFF state; and the geographic zone is sufficiently large such that upon the determination of the at least one geographic coordinate associated with a likelihood of frozen precipitation in the geographic zone around the structure, the control unit controls the heating means so that that the heating means is in the ON state before the frozen precipitation sensor determines that the at least one geographic coordinate associated with a likelihood of frozen precipitation is the same as at least one geographic coordinate of the structure.

2. The apparatus of claim 1, wherein the one or more processors of the frozen precipitation forecast sensor are programmed to:

receive the weather data from one or more Internet-connected weather service servers that serve weather data via the Internet; and determine at least one geographic coordinate associated with a likelihood of frozen precipitation in the geographic zone around the structure based on the weather data received from the one or more Internet-connected weather service servers.

3. The apparatus of claim 1, wherein the frozen precipitation forecast sensor is programmed to:

receive periodic weather data over the time frame from the one or more Internet-connected weather service servers, wherein the frozen precipitation sensor waits a predefined period of time before it receives weather data; and determine at least one geographic coordinate associated with a likelihood of frozen precipitation in a geographic zone around the structure at the time instances based on the periodic weather data.

4. The apparatus of claim 1, wherein the frozen precipitation forecast sensor is in wireless communication with the control unit.

5. The apparatus of claim 1, wherein the frozen precipitation forecast sensor is in wired communication with the control unit.

6. The apparatus of claim 1, wherein the heating means comprises an electrical resistive heater.

7. The apparatus of claim 1, wherein the heating means comprises a pipe for carrying a fluid.

8. The apparatus of claim 2, wherein:

the frozen precipitation forecast sensor further comprises:

a radio receiver for receiving digital weather codes via a radio broadcast; and a decoder in communication with the radio receiver and the one or more programmed processors, wherein the decoder is for decoding the digital weather codes received via the radio broadcast; and the one or more programmed processors of the frozen precipitation forecast sensor are programmed to utilize both the decoded digital weather codes from the radio broadcast and from the one or more Internet-connected weather service servers to determine whether there is a likelihood of frozen precipitation in the geographic zone around the structure.

9. The apparatus of claim 1, wherein:

the frozen precipitation forecast sensor further comprises:

a radio receiver for receiving digital weather codes via a radio broadcast; and a decoder in communication with the radio receiver and the one or more programmed processors, wherein the decoder is for decoding the digital weather codes received via the radio broadcast; and the one or more programmed processors of the frozen precipitation forecast sensor are programmed to utilize the decoded digital weather codes from the radio broadcast to determine whether there is a likelihood of frozen precipitation in the geographic zone around the structure.

10. A method for heating a structure during frozen precipitation, the method comprising:

storing, within a memory, at least one geographic coordinate within a user-defined geographic zone around the structure;

receiving, over a time frame, by a frozen precipitation forecast sensor that comprises one or more programmed processors, weather data for a geographic region in which the structure is located;

determining, by the one or more programmed processors of the frozen precipitation forecast sensor, at time instances during the time frame, that at least one geographic coordinate associated with a likelihood of frozen precipitation is the same as the at least one geographic coordinate within the user-defined geographic zone around the structure based on the received weather data;

transmitting, by the frozen precipitation forecast sensor, command signals to a control unit that controls the operation of a heater used for heating the structure, wherein the command signals comprise command signals for the operational state of the heater and the command signals are based on the determination that the at least one geographic coordinate associated with a likelihood of frozen precipitation is the same as the at least one geographic coordinate within the user-defined geographic zone around the structure;

controlling, by the control unit, the operational state of the heater based on the command signals received from the frozen precipitation forecast sensor;

transmitting, by the frozen precipitation forecast sensor, a first command signal to the control unit that the heater should be in an ON state upon a determination by the frozen precipitation forecast sensor that the at least one geographic coordinate associated with a likelihood of frozen precipitation is the same as the at least one geographic coordinate within the user-defined geographic zone around the structure; and transmitting, by the frozen precipitation forecast sensor, a second command signal to the control unit that the heater should be in an OFF state upon a determination by the frozen precipitation forecast sensor that the at least one geographic coordinate associated with a likelihood of frozen precipitation is not the same as the at least one geographic coordinate within the user-defined geographic zone around the structure; and wherein:

the geographic zone is sufficiently large such that upon the determination of the at least one geographic coordinate where there is a likelihood of frozen precipitation in the geographic zone around the structure, the control unit controls the heater so that that the heater is in the ON state before the frozen precipitation sensor determines that the at least one geographic coordinate associated with a likelihood of frozen precipitation is the same as at least one geographic coordinate of the structure.

11. The method of claim 10, wherein:
receiving the weather data comprises receiving the weather data from one or more Internet-connected weather service servers that serve weather data via the Internet; and
determining comprises determining that the at least one geographic coordinate associated with a likelihood of frozen precipitation is the same as the at least one geographic coordinate in the user-defined geographic zone around the structure based on the weather data received from the one or more Internet-connected weather service servers.

12. The method of claim 10, wherein the transmitting step comprises wirelessly transmitting, by the frozen precipitation forecast sensor, the command signals to the control unit.

13. The method of claim 10, wherein:
receiving the weather data comprises receiving and decoding digital weather codes that are received via a radio broadcast; and
determining comprises determining that the at least one geographic coordinate associated with a likelihood of frozen precipitation is the same as the at least one geographic coordinate within the user-defined geographic zone around the structure based on the decoded digital weather codes from the radio broadcast.

14. The method of claim 11, wherein:
receiving the weather data further comprises receiving and decoding digital weather codes that are received via a radio broadcast; and
determining comprises determining that the at least one geographic coordinate associated with a likelihood of frozen precipitation is the same as the at least one geographic coordinate within the user-defined geographic zone around the structure based on both the decoded digital weather codes from the radio broadcast and the weather data received from the one or more Internet-connected weather service servers.

15. An apparatus for heating a structure during frozen precipitation, the apparatus comprising:
heating means located near the structure;
a control unit connected to the heating means for controlling operation of the heating means; and
a memory configured to store at least one geographic coordinate within a user-defined geographic zone around the structure;
a host server that is in communication with the control unit via the Internet, wherein the server is programmed to:
receive, over a time frame, weather data for a geographic region in which the structure is located, wherein the weather data are received via the Internet from one or more Internet-connected weather service servers that serve weather data via the Internet;
determine, at time instances during the time frame, at least one geographic coordinate associated with a likelihood of frozen precipitation based on the received weather data;
determine whether the at least one geographic coordinate associated with a likelihood of frozen precipitation is the same as the at least one geographic coordinate within the user-defined geographic zone around the structure; and
transmit command signals to the control unit via the Internet based on the determination that the at least one geographic coordinate associated with a likelihood of frozen precipitation is the same as the at least one geographic coordinate within the user-defined geographic zone around the structure, wherein the command signals comprise command signals for an operational state of the heating means, and wherein the control unit controls the heating means based on the command signals transmitted by the host server;
wherein:
upon a determination that the at least one geographic coordinate associated with a likelihood of frozen precipitation is the same as the at least one geographic coordinate within the user-defined geographic zone around the structure, the host server transmits a first command signal to the control unit that the heating means should be in an ON state;
upon a determination that the at least one geographic coordinate associated with a likelihood of frozen precipitation is not the same as the at least one geographic coordinate within the user-defined geographic zone around the structure, the host server transmits a second command signal to the control unit that the heating means should be in an OFF state; and
the geographic zone is sufficiently large such that upon the determination of the at least one geographic coordinate associated with a likelihood of frozen precipitation in the geographic zone around the structure, the control unit controls the heating means so that that the heating means is in the ON state before the frozen precipitation sensor determines that the at least one geographic coordinate associated with a likelihood of frozen precipitation is the same as at least one geographic coordinate of the structure.

16. The system of claim 1 wherein the frozen precipitation forecast sensor is programmed to:
receive, over the time frame, weather data for the geographic region from a second data source; and
determine, at time instances during the time frame, whether there is a likelihood of frozen precipitation in the geographic region by algorithmically weighing the weather data for the geographic region from the first data source and the weather data for the geographic region from the second data source.

17. The system of claim 1 wherein the frozen precipitation forecast sensor is programmed to wait a user-defined period of time after it determines that the at least one geographic coordinate associated with a likelihood of frozen precipitation is the same as the at least one geographic coordinate within the user-defined geographic zone around the structure prior to transmitting the second command signal to the control unit that the heating means should be in an OFF state.

* * * * *